United States Patent [19]
Schaffer et al.

[11] Patent Number: 5,305,408
[45] Date of Patent: Apr. 19, 1994

[54] OPTICAL RECEPTACLE WITH FRICTIONAL CONTAINMENT CELLS FOR ACTIVE DEVICES

[75] Inventors: Ronald R. Schaffer, Harrisburg, Pa.; Gary N. Warner, Memphis, Tenn.

[73] Assignee: The Whitaker Corporation, Wilmington, Del.

[21] Appl. No.: 906,077

[22] Filed: Jun. 29, 1992

[51] Int. Cl.$^5$ .............................................. G02B 6/36
[52] U.S. Cl. ...................................... 385/92; 385/147
[58] Field of Search ................................. 385/92-94, 385/147; 361/392-394

[56] References Cited

U.S. PATENT DOCUMENTS

| | | | |
|---|---|---|---|
| 4,186,995 | 2/1980 | Schamacher | 385/88 |
| 4,767,179 | 8/1988 | Sampson et al. | 350/96.20 |
| 4,802,725 | 2/1989 | Borne et al. | 385/89 |
| 5,078,515 | 1/1992 | Soulard et al. | 385/89 |
| 5,127,073 | 6/1992 | Mulholland et al. | 385/92 |

Primary Examiner—Rodney B. Bovernick
Assistant Examiner—John Ngo
Attorney, Agent, or Firm—Katherine A. Nelson; Driscoll A. Nina, Jr.

[57] ABSTRACT

A one-piece fiber optic receptacle (10) with integrally-molded containment cells (18,19) for frictionally retaining one or more active optical devices (20) within the receptacle (10) during alignment.

17 Claims, 3 Drawing Sheets

OPTICAL RECEPTACLE WITH FRICTIONAL CONTAINMENT CELLS FOR ACTIVE DEVICES

FIELD OF THE INVENTION

The present invention relates to optical fiber connectors and, in particular, to an optical receptacle which employs friction detent cells for containment of active optical devices.

BACKGROUND OF THE INVENTION

Accurate optical data communication requires exact alignment of optical fiber(s) between transmitters and receivers. For this purpose, interconnection systems are used to establish and maintain the proper alignment.

The demand for precision is escalating, and this has been an impetus for numerous improvements to existing fiber optic interconnection systems. However, the insatiable desire for precision must be balanced with an equally important need for economy. Otherwise, commercially impractical product designs result.

It is also desirable to improve the quality and performance of conventional fiber optic products without unduly increasing the cost. Recent efforts have focussed on mechanical safeguards which insure the integrity of the assembly process. For instance, it is now recognized that the maintenance of an initially precise alignment throughout the assembly process is equally as important as the initial alignment. Hence, the overall transmission accuracy can be increased and signal losses can be reduced by a more stable connector.

Conventional connectors include fiber optic receptacles having an outer shell which defines a central chamber with an open end for receiving a mating plug or receptacle cover. At least one cavity (or cell) is formed proximate the opposite end of the shell for receiving an active optical device such as a transmitter or receiver. The receptacle may be a simplex receptacle which houses a single active device for alignment of a single optical fiber therewith. Alternatively, the receptacle may be a duplex receptacle which houses dual active devices for alignment of a duplex optical fiber. In either case, the receptacle is formed with the proper number of containment cavities in which a conventional active optical device (such as a photo-diode, photo-transistor, or the like) is seated.

Co-pending application Serial No. (to be assigned) (AMP Docket 15328) discloses an alignment cover for a conventional fiber optical receptacle The alignment cover performs its traditional function in keeping out dust and debris, yet it also serves to align the active optical device(s), and to keep the devices aligned in the receptacle throughout the assembly process.

There is considerable room for further improvement in this same tradition. One continuing problem lies in the need to hold the active optical devices in the containment cavities of the receptacle as alignment is being achieved. Traditionally, the active devices are glued or manually held in position, but these methods are inconvenient and error-prone.

Consequently, there exists a clear commercial need for an economical means to secure the active devices during alignment, and to maintain proper alignment thereafter.

SUMMARY OF THE INVENTION

It is, therefore, an object of the present invention to provide a fiber optic receptacle with improved containment cell(s) for frictionally retaining one or more active optical devices within the receptacle during alignment.

It is a further object of the present invention to provide a receptacle with frictional containment cells in which the restraint is of a degree which permits alignment of the active optical device(s) but otherwise prevents inadvertent movement.

It is still another object of the present invention to provide a receptacle with the above-described qualities in a cost effective manner.

In accordance with the above-described objects, the present invention provides an improved containment cell for a conventional optical receptacle. The conventional optical receptacle is of a type which includes a housing having an open end for receiving an optical plug, one or more cells for seating a corresponding number of active optical devices in a facing relation to the open end, and optical channels extending between the open face to each one of the cells. The improved containment cell of the present invention comprises a fitted cell for receiving an active optical device, and a resilient panel in each cell for frictionally retaining an active optical device therein. Each panel is formed integrally within the cell and extends along the direction in which the active optical device is inserted into the cell. When the active device is inserted, the resilient panel is driven laterally from the insertion path and is caused to impart an opposing bias against a side of the active device. The lateral bias serves to frictionally retain the active device within the cell.

BRIEF DESCRIPTION OF THE DRAWINGS

Other objects, features, and advantages of the present invention will become more apparent from the following detailed description of preferred embodiments and certain modifications thereof when taken together with the accompanying drawings in which.

DETAILED DESCRIPTION OF THE PREFERRED EMBODIMENT(S)

Figure 1:
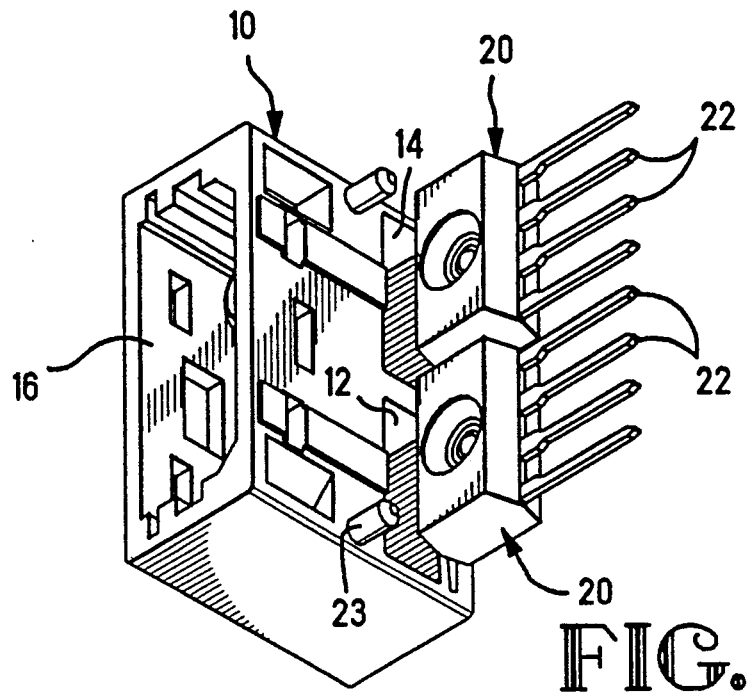
FIG. 1 is a perspective view showing a duplex embodiment of a receptacle according to the present invention.

FIG. 1 illustrates an optical fiber receptacle 10 according to a duplex embodiment of the present invention. Receptacle 10 is preferably integrally molded to form a housing which defines a central chamber having a closed end and an opposing open end 16 for receiving a mating plug (not shown) or, alternatively, a receptacle cover.

In the duplex embodiment shown, side-by-side cells 12 and 14 open to the bottom of receptacle 10 proximate the closed end. It should be understood that the invention described herein may be incorporated in a simplex (single-channel) receptacle, or any other type of receptacle, in which case an alternative number of cells may exist.

Cells 12 and 14 are fitted to receive a pair of active optical devices 20 (such as a photo-diode, photo-transistor, or the like). Optical devices 20 are slidably inserted within the cells 12 and 14 of receptacle 10 such that they face open end 16. Receptacle 10 further includes an internal ferrule receiving member 13 having a bore or channel 15 extending from device 20 to the open end 16 of receptacle 10 to ensure uninterrupted optical communications. This way, the face of each active optical device 20 will be fully exposed through the open end 16 of receptacle 10.

Figure 2:
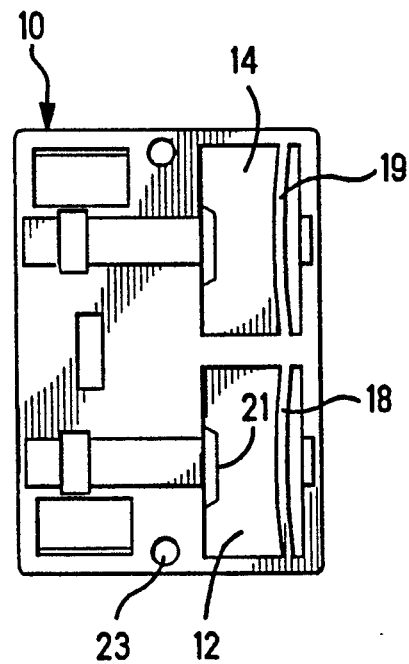
FIG. 2 is a bottom view of the embodiment of FIG. 1.

The active optical devices 20 typically include a plurality of conductive terminals 22 extending therefrom. In the preferred embodiment, a specific type of optical device 20 is used which has a concave face to facilitate alignment, such as with an alignment cover as disclosed in co-pending application Serial No. (to be assigned) (AMP Docket No. 15328). Such concave devices are commercially available Cells 12 and 14 are fitted to receive conventional optical devices 20, which may come in a variety of sizes and shapes. As shown in FIG. 2, receptacle 10 includes integral detent or spring-like panels 18 and 19 formed at the rear of cells 12 and 14. Detent panels 18 and 19 span the respective cells 12 and 14 and are spaced a short distance from the rear wall of receptacle 10. Panels 18 and 19 are preferably formed with a slight arc away from the rear wall and protruding into cells 12 and 14, respectively. Since panels 18 and 19 are integrally molded of plastic or like material, the arc portion is highly resilient and provide spring loading for devices 20.

In operation, panels 18 and 19 are compressed against the rear wall of receptacle 10 when optical devices 20 are inserted therein. The resilience of panels 18 and 19 results in a resisting bias which is imparted laterally to active optical device 20. Consequently, there results a live compression of optical devices 20 within the respective cells 12 and 14. The amount of force exerted by resilient panels 18 and 19 against active devices 20 is sufficient to securely anchor active devices 20 within the respective cells 12 and 14 despite shocks and vibrations which are commonly imparted throughout the assembly process (and thereafter). However, the compressive force exerted by panels 18 and 19 is not excessive inasmuch as active devices 20 can be aligned within their respective cells 18 and 19.

Figure 3:
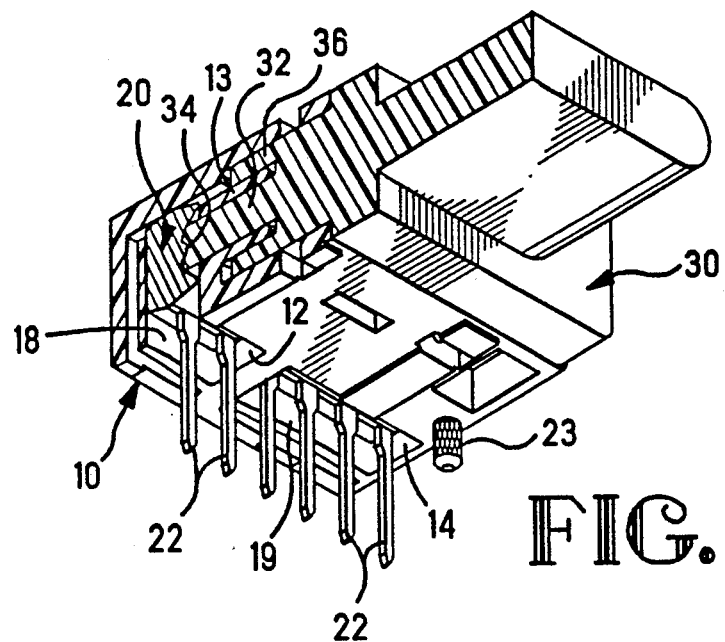
FIG. 3 is a cut-away perspective view of the embodiment of FIGS. 1 and 2 illustrating alignment of a pair of active optical devices therein using an alignment cover as described in co-pending application Serial No. (to be assigned)
Figure 6:
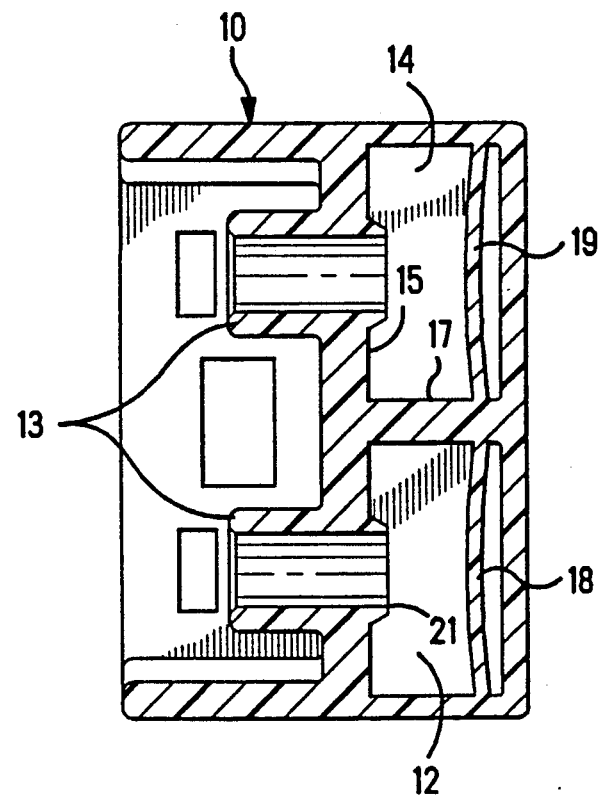
FIG. 6 is a cut-away bottom view of the embodiment of FIGS. 1–5.

As shown in FIGS. 2, 3 and 6, the ferrule receiving member 13 may protrude slightly into the cavity 14 to form an annular lip 21 therein. The annular lip 21 cooperates with the resilient panel 18 to provide a detent for anchoring the active optical device 20 wherein the cavity. The resilient panel 18 is driven laterally by the active optical device 20 during insertion, thereby allowing the active optical device 20 to ride over the protruding annular lip 21. The resilient panel 18 imparts an opposing bias against the active optical device 20 which seats the lip 21 in the concave face of the active optical device 20.

Figure 4:
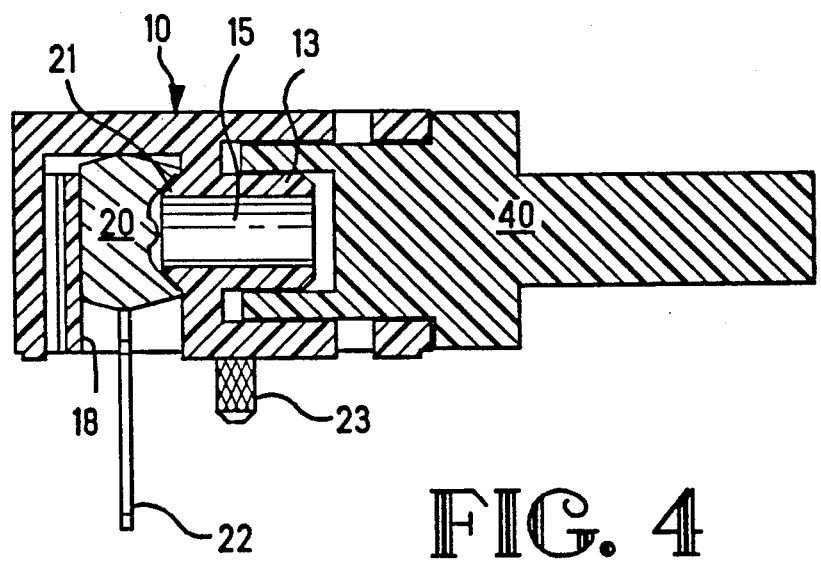
FIG. 4 is a cut-away side view corresponding to FIG. 3.

The alignment may be effected by an alignment cover as shown and described in co-pending application Serial No. (to be assigned) (AMP Docket No. 15328), the disclosure of which is incorporated herein by reference. As shown in FIG. 3, receptacle alignment cover 30 includes a shroud portion 36 and an outwardly protruding pylon 32 having a leading end 34. As alignment cover 30 is inserted into receptacle 10, pylon 32 fits within bore 15, and the shroud portion 36 fits within the open end 16 of receptacle 20. Insertion continues until pylon 32 engages the active optical device 20. If a misalignment exists, the frusto-conical tip 34 of pylon 32 bears against the concave portion of optical device 20 and tends to center the device 20. As further insertion pressure is applied, pylon 32 biases optical device 20 into precise alignment. FIG. 4 shows receptacle 10 with a dust cover 40.

Figure 5:
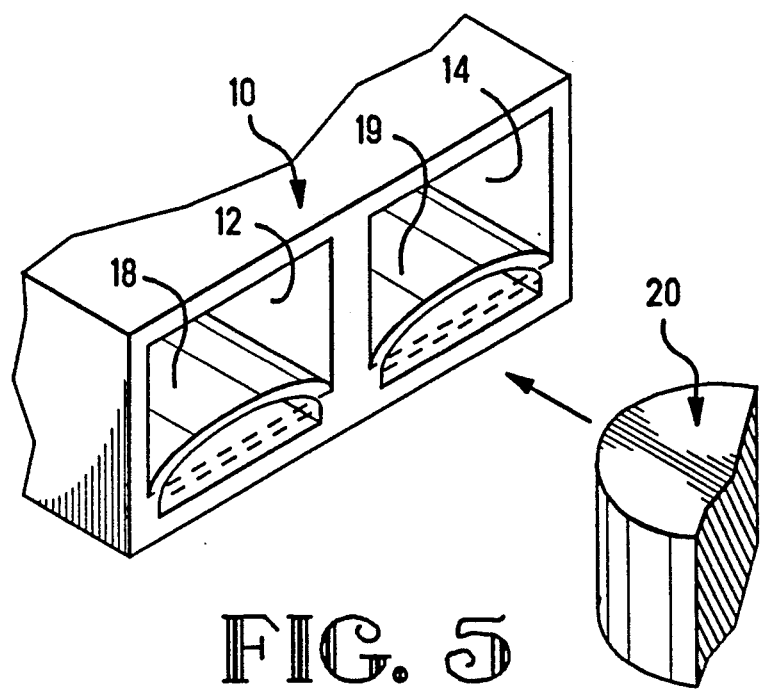
FIG. 5 is an exploded perspective view of dual frictional containment cells according to the duplex embodiment of FIGS. 1–4.

As shown in FIG. 5, active optical devices 20 may come in a variety of shapes and sizes, for instance, they may be shaped (as shown) in the form of a disk. The inner dimensions of cells 12 and 14 may easily be modified to accommodate virtually any conventionally known optical device 20.

In addition, the anchoring force provided by detent panels 18 and 19 against optical devices 20 may be varied. Specifically, the anchoring force can be increased by likewise increasing the thickness of the panels 18 and 19 and/or by increasing the degree of curvature (of the arc) of panels 18 and 19. By varying these characteristics, the lateral anchoring force which secures optical devices 20 within receptacle 10 can be adjusted.

FIG. 6 is a cut-away bottom view corresponding to FIG. 2, in which the preferred structure and support of ferrules 13 is shown. Ferrules 13 are formed integrally with and are supported by an interior wall 15 which bisects the central chamber of receptacle 10. A perpendicular wall 17 extends from wall 15 to the rear of receptacle 10, thereby partitioning cells 14 and 12.

Obviously, many modifications may be made without departing from the basic spirit of the present invention. Accordingly, it will be appreciated by those skilled in the art that within the scope of the appended claims, the invention may be practiced other than has been specifically described herein.

We claim:

1. A containment cell in combination with an optical receptacle and an active optical device, said receptacle including a housing having an open end for receiving an optical plug, and an optical channel extending between said open end and said containment cell, the containment cell further comprising:
   a fitted cavity for seating said active optical device in a facing relation to said open end; and
   a resilient panel for biasing the active optical device towards the open end and to frictionally retain said active optical device within said cavity, said panel being formed integrally within said cavity and extending along a direction in which said active optical device is inserted in said receptacle;
   whereby the resilient panel is driven laterally by insertion of said active optical device and imparts an opposing bias against said active device towards the open end to frictionally retain the active optical device within the containment cell.

2. The containment cell of claim 1, wherein said resilient panel is integrally molded to span said cavity.

3. The containment cell of claim 2, wherein said resilient panel is arched outward from a side-wall of said cavity and insertion of an active optical device within said cavity tends to compress said panel against said side-wall, thereby causing said panel to impart an opposing bias for frictionally retaining said active optical device within said cavity.

4. The containment cell of claim 3, wherein said cavity is bounded by four side-walls, and said resilient panel is integrally molded to span two opposing side-walls.

5. An optical receptacle in combination with an active optical device, said optical receptacle comprising:
   a receptacle housing, said housing including,
      an open end for receiving an optical plug,
      at least one fitted cavity for seating said active optical device in a facing relation to said open end,
      a channel extending between said open end and each one of said cavities to provide an optical communication path between said active optical device and said open end, and
      a resilient panel in each of said cavities for biasing the active optical device towards the open end and to frictionally retain said active optical device therein, each panel being formed integrally within said cavity and extending along a direction in which said active device is inserted in said receptacle housing.

6. The optical receptacle according to claim 5, wherein each resilient panel spans a corresponding cavity to impart a retentive bias to an active optical device seated therein.

7. The optical receptacle according to claim 6, wherein each resilient panel is arched outward from a wall of said cavity, whereby insertion of an active optical device within said cavity compresses said panel towards said wall and causes said panel to impart an opposing retentive bias for frictionally retaining said active optical device within said cavity.

8. The optical receptacle according to claim 7, wherein each cavity is bounded by a front wall facing the open end of said receptacle housing, a parallel rear wall opposite said front wall, and opposing side walls, and said resilient panel is integrally molded with said side walls proximate said rear wall and arches into said cavity toward said front wall.

9. The optical receptacle according to claim 8, wherein said receptacle housing is a duplex receptacle housing further comprising two side-by-side cavities each having a resilient panel formed therein.

10. The optical receptacle according to claim 5, wherein the active optical device has a concave facing side that is facing the open end and the optical receptacle further includes a self-aligning receptacle cover for protecting the open end of the receptacle housing, said cover including an alignment pylon penetrating said channel when said receptacle cover is inserted in said receptacle housing, and said concave facing side of said active optical device to bias said active optical device into alignment with said channel when said receptacle cover is fully inserted.

11. An optical receptacle in combination with an active optical device, said optical receptacle comprising:
   a receptacle housing, said receptacle housing including,
      an open end for receiving an optical plug,
      at least one fitted cavity for seating an active optical device in a facing relation to said open end, said active optical device having a concave facing side,
      at least one ferrule receiving member, each ferrule receiving member being formed integrally in said receptacle housing to provide a channel for an optical communication path between said open end and one of said cavities, each ferrule receiving member protruding slightly into the corresponding cavity to form an annular lip therein, and
      a resilient panel being formed integrally within each of said cavities opposite said lip for fictionally retaining the active optical device within each cavity,
   whereby the resilient panel in each cavity cooperates with the lip of the opposing ferrule receiving member to provide a detent for anchoring said active optical device in said cavity, said resilient panel being driven laterally by one side of said active optical device during insertion thereof and imparting an opposing bias which forces the active optical device to ride over said protruding lip until said lip becomes seated in said concave facing side.

12. The optical receptacle according to claim 11, wherein each resilient panel is integrally molded in and spans a corresponding cavity.

13. The optical receptacle according to claim 12, wherein each resilient panel is arched outward from a wall of said cavity, whereby insertion of an active optical device within said cavity compresses said panel against the wall and causes said panel to impart an opposing bias for frictionally retaining said active optical device within said cavity.

14. The optical receptacle according to claim 13, wherein each cavity is bounded by four walls and said resilient panel is formed integrally with and spans two opposing walls.

15. The optical receptacle according to claim 14, wherein said resilient panel is formed with an arc between said two opposing walls.

16. The optical receptacle according to claim 15, wherein said receptacle housing is a duplex receptacle housing further comprising two side-by-side cavities each having a resilient panel formed therein.

17. The optical receptacle according to claim 11, wherein the active optical device has a concave facing side that is facing the open end and the optical receptacle further includes a self-aligning receptacle cover for protecting the open end of the receptacle housing, said cover including an alignment pylon for aligning said active optical device within said receptacle housing said alignment pylon penetrating said channel when said receptacle cover is inserted in said receptacle housing, and said alignment pylon cooperating with said concave facing side of said active optical device to bias said active optical device into alignment with said channel when said receptacle cover is fully inserted.

* * * * *